US012783569B2

(12) United States Patent
Condessa et al.

(10) Patent No.: US 12,783,569 B2
(45) Date of Patent: Nov. 3, 2026

(54) SYSTEMS AND METHODS FOR ITEM MATCHING USING IMPLICIT REPRESENTATIONS OF ITEMS

(71) Applicant: The Bank of New York Mellon, New York, NY (US)

(72) Inventors: Filipe Joao Cabrita Condessa, Pittsburgh, PA (US); Vadim Pertsovskiy, Chicago, IL (US); Joyotisman Charanasrita Sahoo, New York, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 0 days.

(21) Appl. No.: 19/003,874

(22) Filed: Dec. 27, 2024

(65) Prior Publication Data

US 2026/0187123 A1 Jul. 2, 2026

(51) Int. Cl.
*G06F 16/30* (2019.01)
*G06F 16/334* (2025.01)

(52) U.S. Cl.
CPC ...... *G06F 16/3347* (2019.01); *G06F 16/3341* (2019.01)

(58) Field of Classification Search
CPC .......................... G06F 16/3347; G06F 16/3341
See application file for complete search history.

(56) References Cited

U.S. PATENT DOCUMENTS 9,367,763 B1 6/2016 Soldevila et al.
12,437,062 B1 * 10/2025 Naidoo .................... G06N 3/08
2020/0073879 A1 * 3/2020 Grabau .................. G06N 3/042
2020/0311798 A1 10/2020 Forsyth et al.
2020/0356627 A1 11/2020 Pablo et al.
2023/0325422 A1 * 10/2023 Sullivan ................ G06F 40/117
2024/0037326 A1 * 2/2024 Vargas ................ G06F 16/3347
2024/0054803 A1 * 2/2024 Negi ...................... G06V 10/82
2024/0111794 A1 * 4/2024 Osuala ................ G06F 16/3323
2024/0152561 A1 * 5/2024 Mallapragada ... G06F 16/90335
(Continued)

FOREIGN PATENT DOCUMENTS

WO WO 2023/219679 A1 11/2023

OTHER PUBLICATIONS

Article entitled "Multi-Stage Document Ranking with BERT", by Nogueira et al., dated Oct. 31, 2019 (Year: 2019).*
(Continued)

*Primary Examiner* — Mahesh H Dwivedi
(74) *Attorney, Agent, or Firm* — NORTON ROSE FULBRIGHT US LLP

(57) ABSTRACT

Systems, methods, and computer-readable storage media for item matching from a set of input data are shown. In an aspect, the method includes receiving an input indicating a selected item. The method includes generating, a first embedding associated with the selected item. The method includes comparing the first embedding to a set of embeddings, the set of embeddings based at least in part on a learned mapping function. The method includes identifying one or more item matches between the first embedding and the set of embeddings. The method includes outputting an indication of a one or more item matches and one or more likelihood rankings associated each of the one or more item matches.

16 Claims, 6 Drawing Sheets

(56) References Cited

U.S. PATENT DOCUMENTS

| | | | |
|---|---|---|---|
| 2024/0242260 A1 | 7/2024 | Shanker et al. | |
| 2024/0403339 A1* | 12/2024 | Azizi | G06F 40/30 |
| 2025/0086737 A1* | 3/2025 | Walters | H04L 51/216 |
| 2025/0209484 A1* | 6/2025 | Kasmi | G06N 3/088 |

OTHER PUBLICATIONS

Search Report and Written Opinion for PCT/US2025/061304 mailed Apr. 29, 2026 (Applicant—The Bank of New York Mellon) (8 Pages).

* cited by examiner

SYSTEMS AND METHODS FOR ITEM MATCHING USING IMPLICIT REPRESENTATIONS OF ITEMS

TECHNICAL FIELD

The present disclosure generally relates to item matching from a set of input data and more particularly to systems and methods for providing an indication of matching sets, suggesting items to include in a matching set, and/or providing a ranking of items likely to be in a matching set.

BACKGROUND

Many industries perform item matching, which involves the process of comparing records, transactions, or data from different sources to ensure consistency, accuracy, and compliance. In particular, the process may involve transaction reconciliation where transactions from different records (e.g., bank statement and accounting ledger) are matched to ensure that all transactions from the different records are accurately recorded. For example, in a finance or banking context, the bank statement may include a payment received and the payment may be compared and matched to the accounts receivable in the account ledger (e.g., verifying amount). Similarly, in a financial market environment, item matching may verify trade details. For example, stock purchases and sales may be compared to ensure alignment between buyers, sellers, and/or intermediaries (e.g., clearinghouses). Accordingly, item matching may ensure accuracy (e.g., financial accuracy in a finance environment) and may reduce errors.

Item matching may often be performed by a human operator. For example, the human operator may be tasked with identifying items that satisfy a set of rules for matching the items. Such tasks may be time-consuming and subjective, often resulting in errors and/or biases. Moreover, defining the set of rules for the human operator to use may involve determining and defining criteria, which may also be time-consuming and may require updates as the data changes. In some cases, item matching may be automated using explicit rules in an algorithm. The explicit rules may be rigid and result in unmatched or mismatched item matching.

SUMMARY

To overcome the challenges described above, aspects of the present disclosure provide systems, methods, and computer-readable storage media for item matching from a set of input data and more particularly to systems and methods for providing an indication of matching sets, suggesting items to include in a matching set, and/or providing a ranking of items likely to be in a matching set. The method may include receiving, by one or more processors, an input indicating a selected item (e.g., human operator selects item). The method may include generating, by the one or more processors, a first embedding associated with the selected item. The method may include comparing, by the one or more processors, the first embedding to a set of embeddings (e.g., embedded historical item matches), where the set of embeddings are based on a learned mapping function. The method may include identifying, by the one or more processors, one or more item matches between the first embedding and the set of embeddings. The method may include outputting, by the one or more processors, an indication of a one or more item matches and one or more likelihood rankings associated each of the one or more item matches (e.g., ranking of a quantity of item matches that are ranked by most likely to least likely). In some examples, the set of embeddings is based on previously identified item matches and an embedding function (e.g., embedded historical matches to compare the embedded selected item in the same format).

In some examples, to generate the learned mapping function, the method may include applying, by the one or more processors, an embedding function to a set of input data to generate the set of embeddings, where the set of input data comprises previously identified item matches. The method may include generating, by the one or more processors, a vector space representation of the set of embeddings. The method may include applying, by the one or more processors, a loss function to the vector space representation of the set of embeddings (e.g., minimizing distance and maximizing distance between matched and unmatched embedded historical item matches). The method may include generating, by the one or more processors, the learned mapping function based on applying the loss function to the vector space representation of the set of embeddings.

In some examples, identifying the one or more matches is based on a distance between each of the set of embeddings in the vector space. In some examples, the method may include receiving, by the one or more processors, input indicating selection of a portion of item matches from the one or more item matches. The method may include generating, by the one or more processors, a reranking of the one or more likelihood rankings based on the selection of the portion of item matches. In some examples, the selected item, the set of input data, or both, comprise text data, tabular data, or both In some examples, identifying the one or more item matches is based on a multi-stage process comprising a plurality of algorithms, the multi-stage process organized in a cascade structure. In such examples, the output of a first stage of the multi-stage process comprises moving the item matches to a matched group while inputting unmatched items into a second stage of the multi-stage process. In such examples, moving the item matches to the matched group is based on a similarity value threshold.

Using the aforementioned features, which are described in more detail below with reference to FIGS. 1-6, item matching that involves providing an indication of matching sets, suggesting items to include in a matching set, and/or providing a ranking of items likely to be in a matching set, may facilitate in accurate and efficient item matching. Such item matching features may also reduce errors associated with manual item matching tasks. Moreover, the techniques described herein involve implicit item matching that may facilitate in identifying matches or likely matches that may not be recognizable using explicit, rigid rules. Accordingly, the techniques described herein may enable better identification of relationships and patterns with respect to manual identification or predefined explicit rules, resulting in accurate item matching.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the embodiments illustrated in greater detail in the accompanying drawings, wherein.

Figure 1:
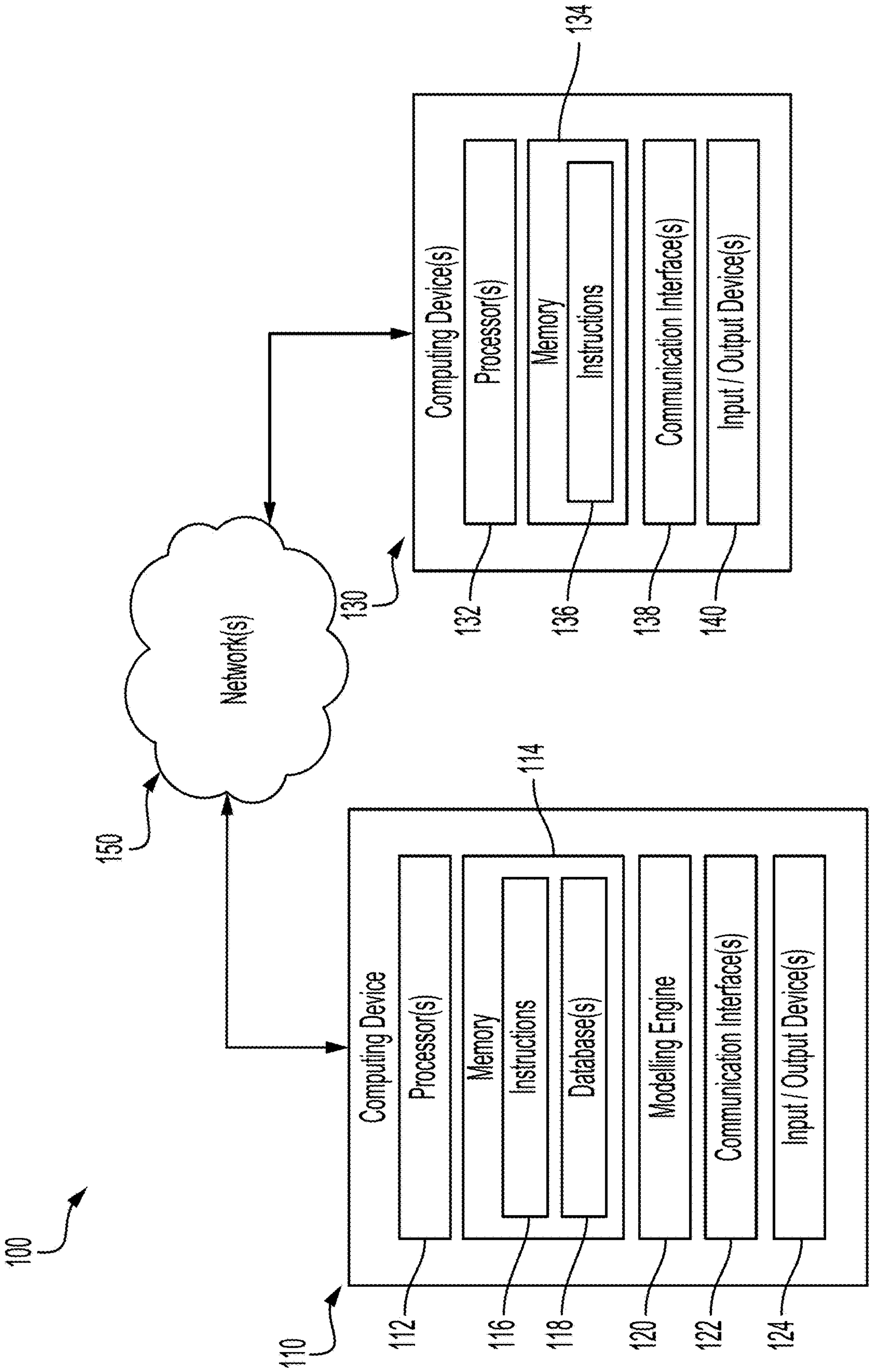
FIG. 1 is a block diagram illustrating an example system for item matching using implicit representation of items in accordance with aspects of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Item matching may involve the process of comparing sets of data to identify corresponding entries or matching entries as matched sets. In some cases, the process may involve transaction reconciliation where transactions from different records (e.g., bank statement and accounting ledger) are matched so that all transactions from the different records are accurately recorded. For example, the bank statement may include a payment received and the payment may be compared and matched to the accounts receivable in the account ledger (e.g., verify amount).

Performing item matching may involve a human operator or may be automated using explicit rules. For example, a human operator may be tasked with matching items based on a set of rules. Manually determining matches based on the set of rules may be time-consuming and subjective, often resulting in errors and/or biases. For automated matching, explicit rules for algorithms may be used. The explicit rules may be predefined and include rigid criteria that control how items are compared and matched. For example, such rigidity may not allow for variations in the items, resulting in less matches (e.g., false negatives).

As discussed herein, to accurately and efficiently item match, implicit representations may be used. The item matching discussed herein may also provide an indication of matching sets, suggesting items to include in a matching set, and/or providing a ranking of items likely to be in a matching set. Such matching techniques may facilitate better matching results and reduce false negatives. For example, the ranked items may include items that may likely be matched rather than excluding the items as a match. The item matching techniques described herein may facilitate better identification of relationships and patterns with respect to manual identification or predefined explicit rules.

In particular, the process of item matching may include receiving, by one or more processors, an input indicating a selected item. The selected item, the set of input data, or both, may include text data, tabular data, or both. The process may include generating, by the one or more processors, a first embedding associated with the selected item. The process may include comparing, by the one or more processors, the first embedding to a set of embeddings, the set of embeddings based on a learned mapping function. The set of embeddings may be based on previously identified item matches and an embedding function.

To generate the learned mapping function, the process may include applying, by the one or more processors, an embedding function to a set of input data to generate the set of embeddings, where the set of input data comprises previously identified item matches. The process may include generating, by the one or more processors, a vector space representation of the set of embeddings. The process may include applying, by the one or more processors, a loss function to the vector space representation of the set of embeddings. The process may include generating, by the one or more processors, the learned mapping function based on applying the loss function to the vector space representation of the set of embeddings.

The process may include identifying, by the one or more processors, one or more item matches between the first embedding and the set of embeddings. In some examples, the identifying the one or more matches may be based on a distance between each of the set of embeddings in the vector space.

In some examples, identifying the one or more item matches may be based on a multi-stage process comprising a plurality of algorithms, the multi-stage process organized in a cascade structure. The output of a first stage of the multi-stage process may include moving the item matches to a matched group while inputting unmatched items into a second stage of the multi-stage process. Moving the item matches to the matched group may be based on a similarity value threshold.

The process may include outputting, by the one or more processors, an indication of a one or more item matches and one or more likelihood rankings associated each of the one or more item matches. In some examples, the process may include receiving, by the one or more processors, input indicating selection of a portion of item matches from the one or more item matches. The process may include generating, by the one or more processors, a reranking of the one or more likelihood rankings based on the selection of the portion of item matches.

Referring to FIG. 1 a block diagram of a system operating in accordance with aspects of the present disclosure is shown as a system 100. The system 100 includes a computing device 110 configured to receive sets of input data, such as from a computing device 130 via one or more networks 150, and to produce, as output, matched items in a match set. Other outputs may include suggesting items to include in a match set or a ranking of items likely to be in a match set. It is noted that while FIG. 1 is primarily described with reference to functionality provided by computing device 110, it should be understood that the functionality described herein may be provided in a distributed computing environment, such as using a set of computing devices 110, or a cloud-based deployment.

As illustrated in FIG. 1, the computing device 110 includes one or more processors 112, a memory 114, a modeling engine 120, one or more communication interfaces 122, and input/output (I/O) devices 124. The one or more processors 112 may include a central processing unit (CPU), graphics processing unit (GPU), a microprocessor, a controller, a microcontroller, a set of microprocessors, an application-specific integrated circuit (ASIC), an application-specific standard product (ASSP), or any combination thereof. The memory 114 may include read only memory (ROM) devices, random access memory (RAM) devices, one or more hard disk drives (HDDs), flash memory devices, solid state drives (SSDs), other devices configured to store data in a persistent or non-persistent state, network memory, cloud memory, local memory, or a combination of different memory devices. The memory 114 may also store instructions 116 that, when executed by the one or more processors 112, cause the one or more processors 112 to perform operations described herein with respect to the functionality of the computing device 110 and the system 100. The memory 114 may further include one or more databases 118, which may store data associated with operations described herein with respect to the functionality of the computing device 110 and the system 100.

The communication interface(s) 122 may be configured to communicatively couple the computing device 110 to the one or more networks 150 via wired and/or wireless communication links according to one or more communication protocols or standards. The I/O devices 124 may include one or more display devices, a keyboard, a stylus, a scanner, one or more touchscreens, a mouse, a trackpad, a camera, one or more speakers, haptic feedback devices, or other types of devices that enable a user to receive information from or provide information to the computing device 110.

The one or more databases 118 may be configured to store information and/or documents. For example, the one or more databases 118 may include one or more databases storing input data sets that are compared for item matching, and other data that may be used for implicit learning to provide the item matching, as discussed with respect to FIGS. 2-6. For example, the one or more databases 118 may also store embedding functions used for embedding the input data (e.g., implicit representations), as well as algorithms for implicit learning to generate the item matches, suggested items to be included in a match set, and/or ranking of items that may belong to a match set, based on the embedded input data.

The computing device 130 is shown to include one or more processors 132, a memory 134 storing instructions 136, one or more communication interfaces 138, and one or more I/O devices 140. These elements of the computing device 130 may be similar to the corresponding elements of the computing device 110 described above.

The modeling engine 120 of the computing device 110 may be configured to support operations for accurately identifying match sets and reducing false negatives (e.g., by providing a ranking of items that are likely matches), as discussed in detail with respect to FIGS. 2-6. Although the following discussions describe the modeling engine 120 as performing the embedding of input data and identifying relationships or patterns in the embedded representation of the input data for item matching, the techniques described herein may be performed, additionally, or alternatively, by the computing device 110 or any components of the computing device 110.

For example, the modeling engine 120 may be configured to receive, by one or more processors, an input indicating a selected item. The modeling engine 120 may generate, by the one or more processors, a first embedding associated with the selected item. The modeling engine 120 may compare, by the one or more processors, the first embedding to a set of embeddings, the set of embeddings based on a learned mapping function. The modeling engine 120 may identify, by the one or more processors, one or more item matches between the first embedding and the set of embeddings. The modeling engine 120 may output, by the one or more processors, an indication of a one or more item matches and one or more likelihood rankings associated each of the one or more item matches.

In some examples, the set of embeddings may be based on previously identified item matches and an embedding function. Identifying the one or more matches may be based on a distance between each of the set of embeddings in the vector space. In some examples, identifying the one or more item matches is based on a multi-stage process comprising a plurality of algorithms, the multi-stage process organized in a cascade structure. The output of a first stage of the multi-stage process may include moving the item matches to a matched group while inputting unmatched items into a second stage of the multi-stage process. Moving the item matches to the matched group may be based on a similarity value threshold.

In some examples, the modeling engine 120 (e.g., for model training) may apply, by the one or more processors, an embedding function to a set of input data to generate the set of embeddings, wherein the set of input data comprises previously identified item matches. The modeling engine 120 may generate, by the one or more processors, a vector space representation of the set of embeddings. The modeling engine 120 may apply, by the one or more processors, a loss function to the vector space representation of the set of embeddings. The modeling engine 120 may generate, by the one or more processors, the learned mapping function based on applying the loss function to the vector space representation of the set of embeddings.

In some examples, the modeling engine 120 may receive, by the one or more processors, input indicating selection of a portion of item matches from the one or more item matches. The modeling engine 120 may generate, by the one or more processors, a reranking of the one or more likelihood rankings based on the selection of the portion of item matches. In some examples, the selected item, the set of input data, or both, may include text data, tabular data, or both.

Figure 2:
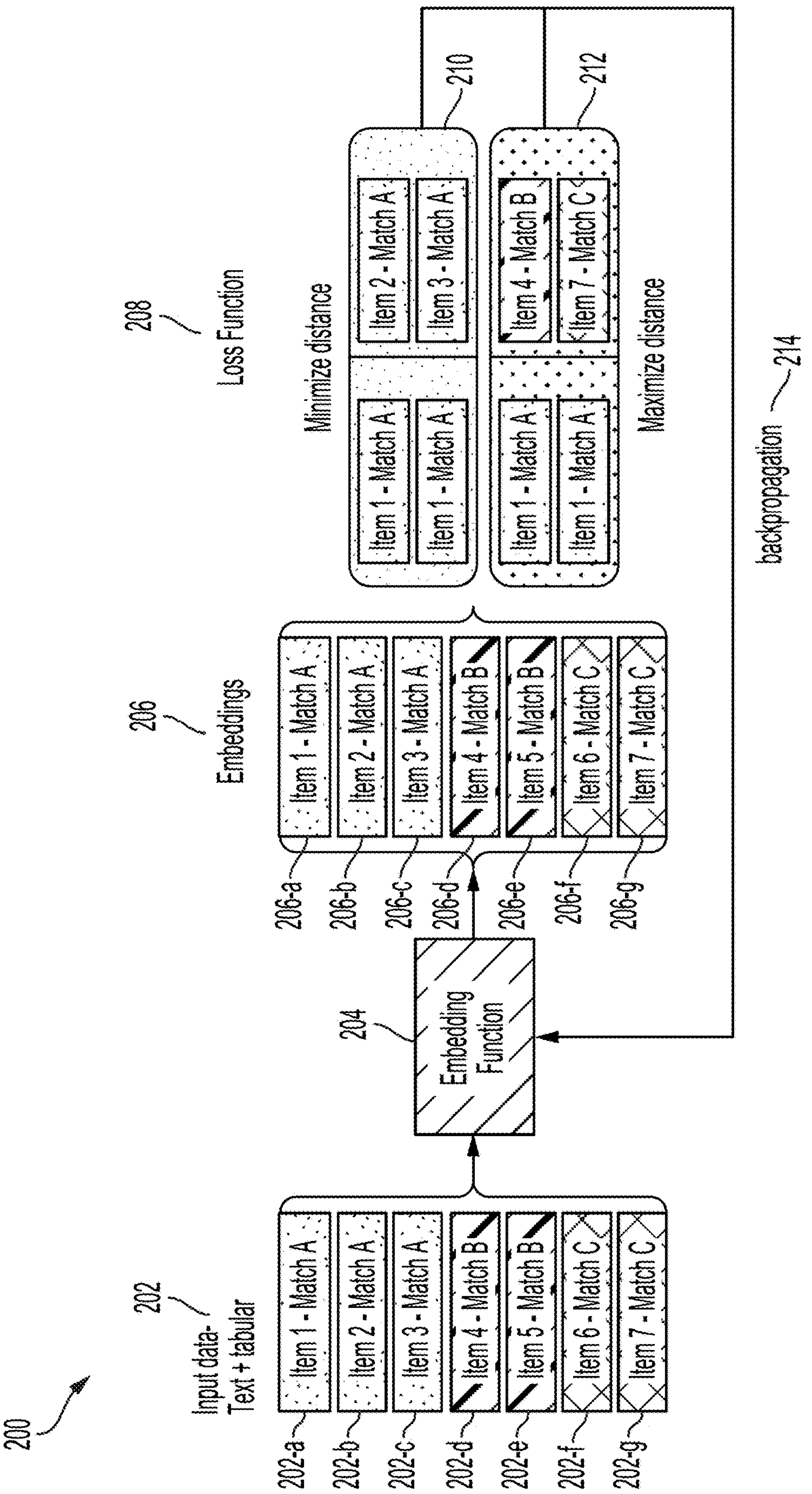
FIG. 2 is a flow diagram for an example method of training a model used in item matching in accordance with aspects of the present disclosure.

FIG. 2 is a flow diagram 200 for identifying representative data in accordance with aspects of the present disclosure. The flow diagrams described herein, including the flow diagram 200, may implement aspects of or may be implemented by aspects of the system 100. In the following descriptions of flow diagrams described herein, including the flow diagram 200, the operations performed may be performed in different orders or at different times than the exemplary order shown. Some operations and/or components may also be omitted from the flow diagram 200, or other operations and/or components may be added to the flow diagram 200. The examples described herein are not to be construed as limiting, as the described features may be associated with any quantity of different devices. Although the techniques described herein are described with respect to financial items, the techniques may apply to any environment or context involving item matching. As an example, the techniques described herein may apply to healthcare, retail, stocks, manufacturing, and the like.

The process of a training a model to learn and implicitly identify item matching may include receiving input data of N items 202 along with their item matches, where N refers to two or more items 202 (e.g., 2, 20, 35, 50, 1000, 100000, and so forth). In some examples, the input data may be text, such as words or sentences, or tables. In the depicted example, the input text includes 7 items, such as a first item 202-*a* (Item 1—Match A), a second item 202-*b* (Item 2—Match A), a third item 202-*c* (Item 3—Match A), a fourth item 202-*d* (Item 4—Match B), a fifth item 202-*e* (Item 5—Match B), a sixth item 202-*f* (Item 6—Match C), and a seventh item 202-*g* (Item 7—Match C).

The first item 202-*a*, the second item 202-*b*, and the third item 202-*c* may belong to the same group and may be indicated as belonging to a matching set A (Match A). The fourth item 202-*d* and the fifth item 202-*e* may belong to the same group and may be indicated as belonging to a matching set B (Match B). The sixth item 202-*f* and the seventh item 202-*g* may belong to the same group and may be indicated as belong to a matching set C (Match C). That is, based on the context (e.g., specific words) of each of the items, the items may be matched to a respective group corresponding to the context. As an example, the first item 202-*a*, the second item 202-*b*, and the third item 202-*c* may have a context describing or associated with the same task, and thus, these items 202 are matched to the same task group, Match A.

The process includes inputting the N items 202 into an embedding function 204 (e.g., one or more embedding functions). The embedding function 204 may map the input data (e.g., context) of each of the items 202, such as the text, into a dense, fixed-dimensional or high-dimensional vector space. For example, the embeddings may take input data (e.g., words) and represent them as vectors of real numbers. The transformation of the input data into a vector format may reduce the dimensionality of the data while maintaining key properties and relationships.

As a result, the process includes generating embeddings 206 corresponding to each of the items 202, respectively. In this example, the resulting embeddings 206 include a first embedding 206-*a* (Item 1—Match A), a second embedding 206-*b* (Item 2—Match A), a third embedding 206-*c* (Item 3—Match A), a fourth embedding 206-*d* (Item 4—Match B), a fifth embedding 206-*e* (Item 5—Match B), a sixth embedding 206-*f* (Item 6—Match C), and a seventh embedding 206-*g* (Item 7—Match C).

In the high-dimensional space, a loss function 208 may be applied to the embeddings 206. The loss function 208 may measure how well the embeddings 206 align with a desired output (e.g., similar item inputs should have closer embeddings, dissimilar item inputs farther apart). For example, the loss may be low when similar pairs (indicating a likely match) are close while pairs that are not similar are distant. The loss function 208 may facilitate in learning embeddings 206 that reflect the relationship between items. In particular, for positive pair of items that are an item match, the distance between the respective embeddings 206 of the positive pair items may be minimized. That is, distance between the two or more items belonging to a matching group may be minimized so that the respective embeddings 206 are closer in distance in the vector space.

In this example, the first embedding 206-*a*, the second embedding 206-*b*, and the third embedding 206-*c* belong to a group for Match A. Accordingly, the first embedding 206-*a* and the second embedding 206-*b* are an item matched pair, the first embedding 206-*a* and the third embedding 206-*c* are a matched pair, and the second embedding 206-*b* and the third embedding 206-*c* are a matched pair. Thus, a minimizing of distance 210 may be applied to the embeddings 206. For example, the distance between the first embedding 206-*a*, the second embedding 206-*b*, and the third embedding 206-*c* may be reduced or minimized.

However, for unmatched pairs or negative pairs, the loss function 208 may increase the distance between the respective embeddings 206. Here, the first embedding 206-*a* belongs to group for Match A while the fourth embedding 206-*d* belongs to a group for Match B and a seventh embedding 206-*g* belongs to a group Match C. Accordingly, these embeddings 206 are unmatched pairs since they belong to different groups. Thus, a maximizing of distance 214 may be applied to the items 202. For example, the distance between the first embedding 206-*a* (e.g., item of Match A) and the fourth embedding 206-*d* (e.g., item of Match B) may be increased or maximized. Similarly, the distance between the first embedding 206-*a* (e.g., item of Match A) and the seventh embedding 206-*g* (e.g., item of Match C) may be increased or maximized.

The embedding function 204 may be trained by iteratively updating parameters of the embedding function 204 to reduce or minimize the loss function 208. The trained embedding function 204 may provide implicit representation of the items 202, such that item matching may be inferred based on the training.

In some examples, the embedding function may be a neural network or the like, that maps the items (e.g., input data indicating items 202) to vector representations (e.g., embeddings 206) in a high-dimensional vector space. Backpropagation 214 may be applied to the outputs from the loss function 208, ensuring that the embeddings 206 become more effective and accurate for identifying meaningful relationships in the data. Backpropagation 214 may tune the embedding function 204 to create embeddings 206 that are accurate for the specific task, such as for item matching resulting from similarity comparison or classifications. The trained embedding function 204 may result in a learned embedding function, as discussed with respect to FIG. 3 to accurately identify item matches or likelihood of matches, as discussed herein.

In some examples, the embedding function 204 may be a transformer-based model, which may be fine-tuned using contrastive loss to minimize or maximize the distance between the pairs of items 202 in the vector space. For example, the training process may be performed across the set of matches until a convergence criteria is met (e.g. a number of epochs, a threshold on the loss function, etc.). In some examples, a regularization term may be included in the training to ensure that the norm of each mapped item 202 in the embeddings 206 is either fixed or bounded. For example, regularization term may be an additional component added to the loss function 208 in machine learning models to accommodate complexity, prevent overfitting, and to ensure generalization to unseen data. The regularization term may involve applying constraints on the parameters of the embedding function 204 during training to reduce or prevent the embedding function 204 from becoming specialized in the training data. A secondary training process may be implemented that involves partial matching (e.g., fuzzy matching). The partial matches may be combined (e.g., merge multiple embeddings 206) to provide a comprehensive representation. For example, the embeddings 206 may be combined by via averaging or by convex combination. The distance between the embeddings 206 from the same group item match may be minimized and the distance between the embeddings 206 that do not belong to the same group item match may be maximized. not belonging to the same match.

Figure 3:
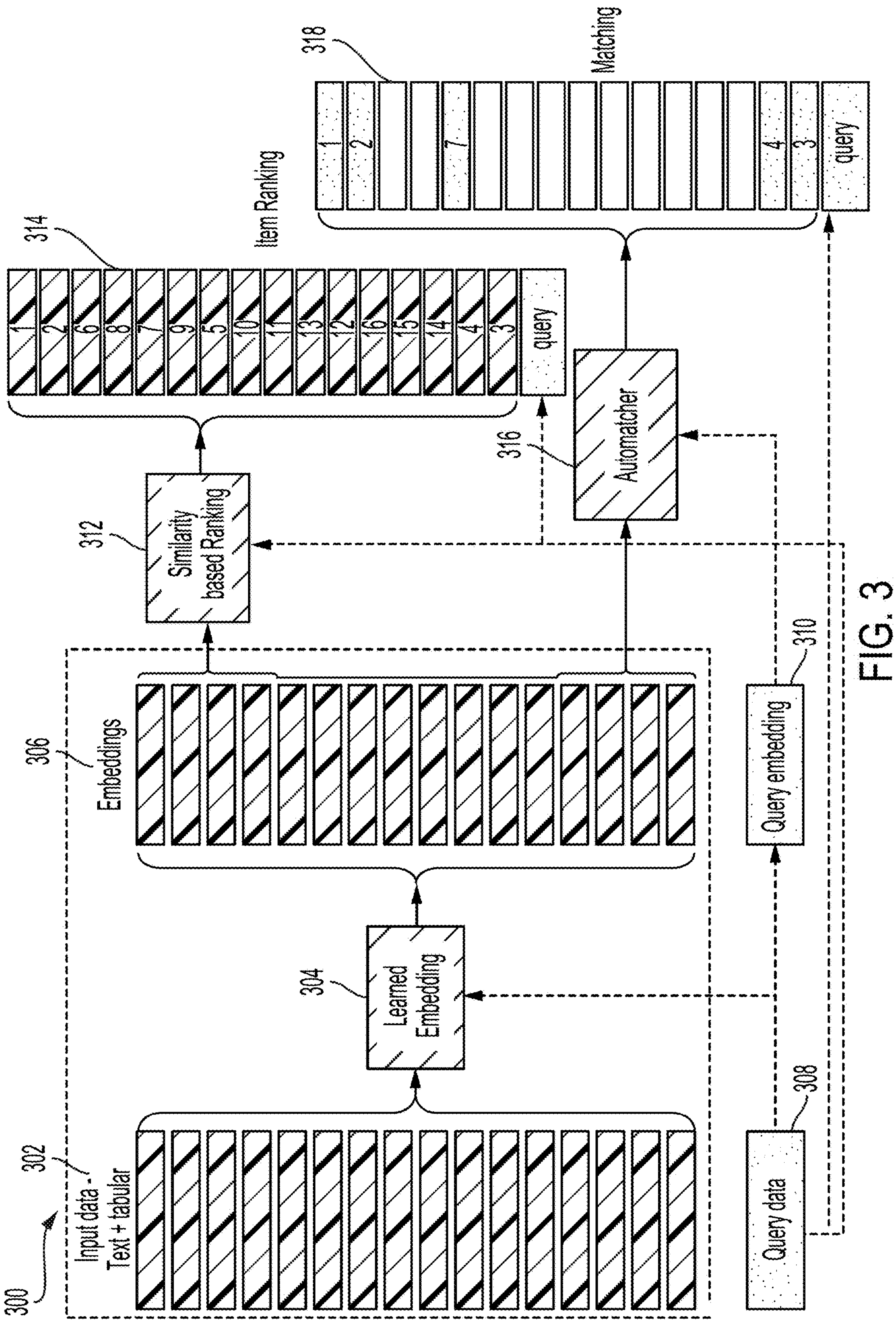
FIG. 3 is a flow diagram for an example approach for item matching using implicit representation of items in accordance with aspects of the present disclosure.

FIG. 3 is flow diagram for a process 300 for item matching using implicit representation in accordance with aspects of the present disclosure. The flow diagrams described herein, including the process 300, may implement aspects of or may be implemented by aspects of the system 100. In the following descriptions of flow diagrams described herein, including the process 300, the operations performed may be performed in different orders or at different times than the exemplary order shown. Some operations and/or components may also be omitted from the process 300, or other operations and/or components may be added to the process 300. The examples described herein are not to be construed as limiting, as the described features may be associated with any quantity of different devices.

The process 300 describes the process of item matching using the trained embedded function discussed with respect to FIG. 3. The items 302 may be inputted through the learned embedding function 304 (e.g., embedding function 204 of FIG. 2 after training) to output embeddings 306 that correspond to the items 302. This process may be performed as discussed with respect to FIG. 2 (as indicated by the dashed line box). The learned embedding function 304 may infer or have intuition of item matching based on learning via the techniques discussed with respect to FIG. 2. The learned embedding function 304 may perform decision-making without explicit rules for all possible matching scenarios. For example, the learned embedding function may generalize from patterns in data and make inferences based on learned matched items.

The process 300 may include receiving query data 308, which involves input data provided to the learned embedding function 304 that is used to make item matching inferences. An item, such as a selected item 302, may query the learning embedding function 304. The query data 308 may be embedded via an embedding function, and the query embedding 310 may be compared to the embeddings 306 (in the same format). Based on a similarity-based ranking 312, the compared embeddings 306 may be ranked based on the distance between the embeddings 306 in the vector space, indicative of similarity. For example, the ranking may rank the top k matches (e.g., exact match, close match, etc.), where k is one or more matches, in a descending order. As an example, if an item 302 is embedded to an embedding 306 and an item match is a set of embeddings 306, then the embeddings 306 may be summed and represented in the same format.

In some examples, the item matching may be performed based on an autopilot algorithm where executing the algorithm causes tasks associated with item matching to be automatically performed (e.g., computing distance between items, determining ranking, etc.). For example, the similarity-based ranking 312 may output a ranking of items 314 that may be item matches based on a likelihood of matching (e.g., based on a distance or a threshold distance). A new set of items 302 (e.g., as query data 308) may be inputted to the learned embedding function 304 and compared to a set of items 302 that may be a match for item matching. Each of the new set of items 302 and the potential matching items 302 may be mapped to the vector space using the learned embedding function 304. The distance between each of the new set of items 302 and the existing set of items 302 that may be matches, may be computed in the vector space. The distance may be computed using a variety of metrics, such as Euclidean distance, cosine similarity, and/or other distance metric techniques. One or more aggregation functions may be used to compute the distance between the embeddings 306 of new set of items 302 and the potential matching items 302, such as the mean, the maximum, the minimum, or other aggregation functions. The potential matching items 302 may be sorted based on respective similarity ranking to the new set of items 302 in the vector space. The top potential matching items 302 may be recommended to the user as potential matches to the set the new set of items 302.

After a selection is made, the new set of items 302 may be augmented and a new set of distances may be computed between each of the new set of items 302 and the potential matching items 302 in an incremental manner. The ranking of the items 302 in the potential matching items 302 may be updated based on the new distances and the top items may be recommended to the user as potential matches to the augmented new set of items 302.

In some examples, the process 300 may include the embeddings 306 and the query embedding 310 being inputted into an auto-matcher 316. The auto-matcher 316 may compute an efficient representation of the input query data 308 by generating the query embedding 310, identify potential item matching 318 and item rankings, select item matches, and apply an optional filtering process to reject matches that are likely to be invalid. The identifying potential matches and ranking and selecting the item matches, may occur after different item matching techniques.

For example, the auto-matcher 316 may use a constraint function that maps the potential matching items 302 to a Boolean. As further discussed with respect to FIG. 5, the auto-matcher 316 may iteratively select item matches of the item matching 318 and remove items 302 that belong to plausible item matches from the set of potential matching items 302. Multiple overlapping item matches (e.g., including at least one common embedding 306 of an item 302) may be computed and ranked based on a set of criteria leveraging statistical similarities between proposed matches and historical matches. The top k item matches may be selected and removed from the set of potential matching items 302. The process may be iteratively repeated until no potential matches are left in the set potential matching items 302.

Figure 4:
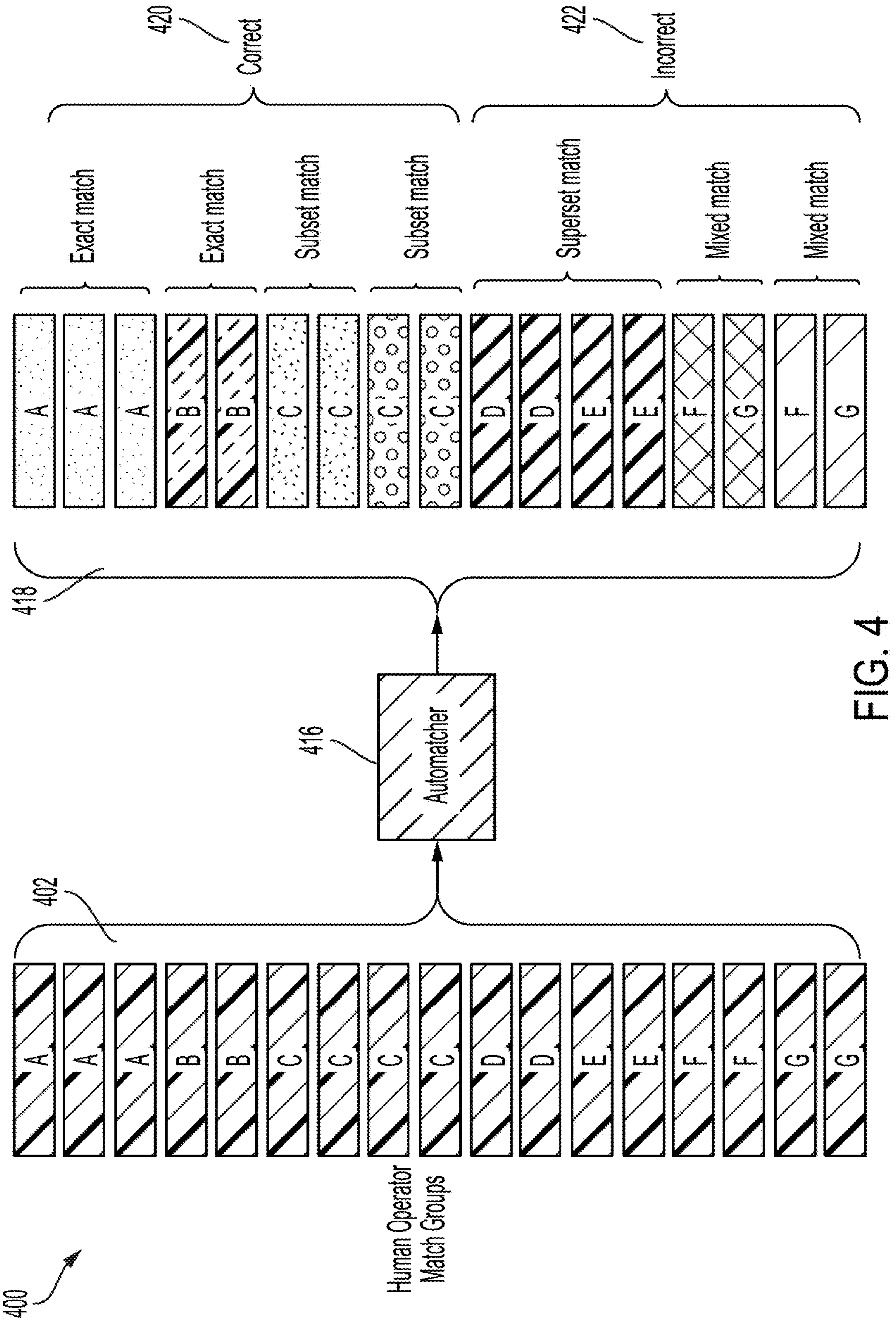
FIG. 4 is a flow diagram for an example approach for item matching using implicit representation of items in accordance with aspects of the present disclosure.

FIG. 4 is a flow diagram of a process 400 for item matching using an auto-matcher in accordance with aspects of the present disclosure. The auto-matcher 416 may operate and function as discussed with respect to the auto-matcher 316 of FIG. 3. In the process 400, a human operator may group one or more items 402 into a single match group. For example, in the distribution of items 402, the human operator may have grouped the items 402, such that the first three items 402 correspond to Match A, the following two items 402 correspond to Match B, the following four items 402 correspond to Match C, the following two items correspond to Match D, the following two items correspond to Match E, the following two items correspond to Match F, and the following two items correspond to Match G.

As discussed herein, the auto-matcher 416 may leverage the efficient representation to provide user-relevant suggestions for item matching 418 (e.g., ranging from ranking potential items for match to suggesting and ranking complete matches. The process 400 may include applying the auto-matcher 416. The auto-matcher 416 may output item matching 418. As previously mentioned, the auto-matcher 416 may facilitate in identifying potential matches, ranking matches, selecting matches, and/or filter out or remove matches that are likely invalid.

Applying the auto-matcher 416 to the items 402 of the human operator match groups may result in different level of ranking for the item matching 418. For example, the auto-matcher 416 may also compute that the that the first three items 402 correspond to Match A, as an exact match (e.g., human operator match group is correct). The auto-matcher 416 may compute that the following two items 402 also correspond to Match B, as an exact match. The auto-matcher 416 may compute that the following four items 402 correspond to Match C, but that the four items actually include a subset of items that are item matches. For example, two of the four items 402 may correspond to a first subset batch and two of the four items 402 may correspond to a second subset match. The exact matches and the subset matches may be considered accurate or correct matches 420, for example, to be used for other inferences. The auto-matcher 416 may compute that the following two items corresponding to Match D and the following two items corresponding to Match E, may actually belong to the same group, such that there is a superset match combining the items 402 to belong to the same group. The auto-matcher 416 may compute that the following two items corresponding to Match F are a mixed match, and the following two items corresponding to Match G are also a mixed match. For example, at least one of the identified items 402 of Match F is actually item matched to Match G, and at least one of the identified items 402 of the Match G is actually item matched to Match F. The superset matches and the mixed matches may indicate as incorrect matches 422 while the exact matches and subset of matches may indicate correct matches 420.

Figure 5:
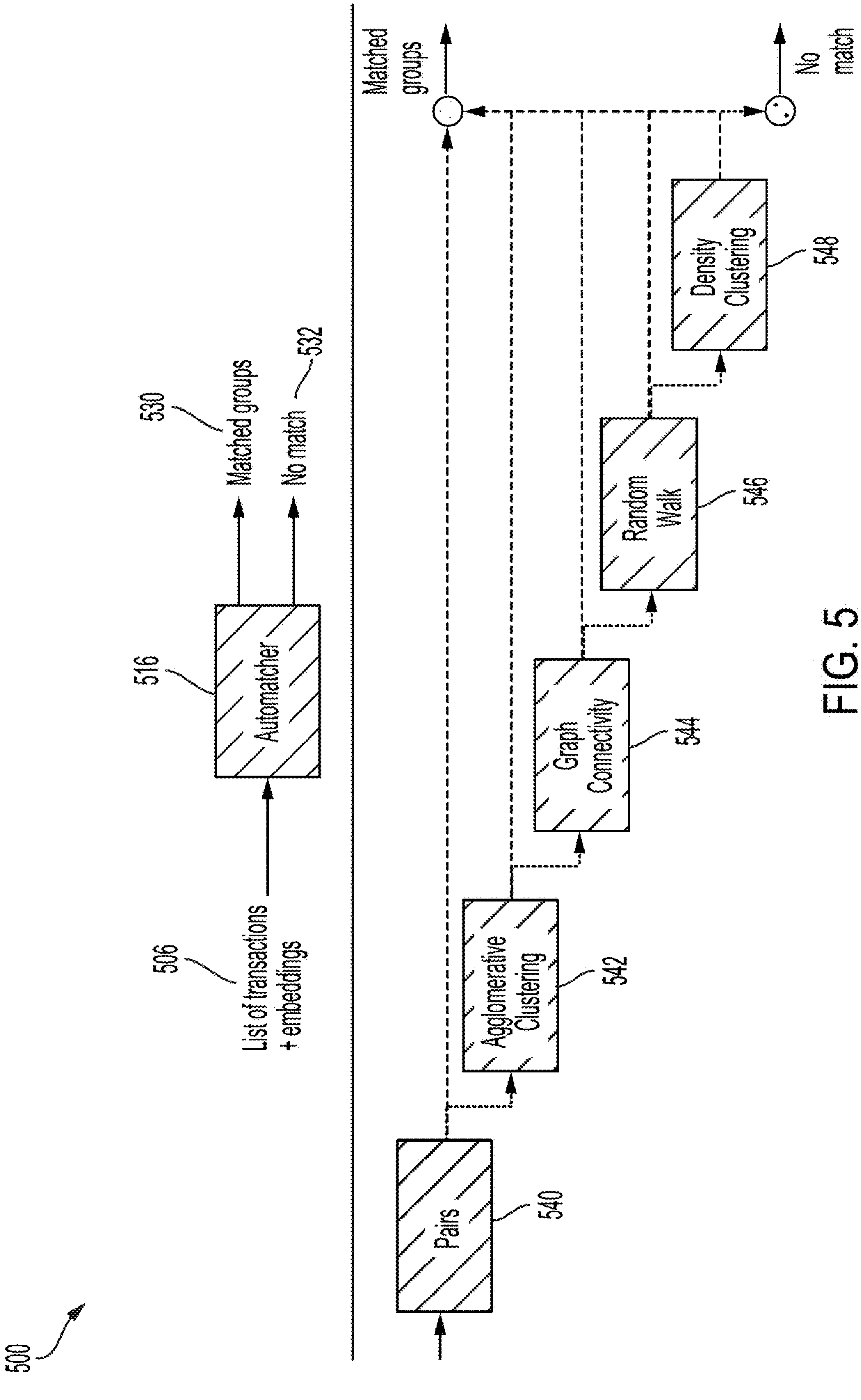
FIG. 5 is a flow diagram for an example approach for item matching using implicit representation of items in accordance with aspects of the present disclosure.

FIG. 5 is a flow diagram of a process 500 for item matching using implicit representation of items in accordance with aspects of the present disclosure. The process 500 may facilitate finding item matches for a list of transactions and embeddings 506, applying the auto-matcher 516, and identifying matched groups 530 or not matched groups 532.

The matching may involve constraint driven matches that are validated via similarity of the embeddings (e.g., pairs) and/or similarity-based matches that are validated via constraint functions, such as agglomerative clustering, similarity-based, graph connectivity, random walk, and clustering).

The process 500 may include inputting the list of transactions and embeddings 506 to a pair process 540. For all possible pairs of items (e.g., between the query embedding (s) and the embeddings), pairs are selected such that all applicable constraint functions are satisfied. An inner product (or cosine similarity) between the embeddings of the items e.g., between the query embedding(s) and the embeddings) in the vector space may be computed. Pairs that have a similarity level below a threshold similarity value may be rejected as a match (e.g., no match). Based on historical data, the likelihood of matched pairs may be compared based on a frequency of the observation of variables and/or reject pairs with a frequency less than a threshold frequency (e.g., less than 100 times, 5 times, 2 times etc.). Match proposals may be ranked based on a weighted harmonic mean of the similarity of the embeddings and the likelihood of the match pair based on historical data. The top matches may be selected from a ranking list while the unmatched pairs may be removed, in an iterative manner, until there are no potential matches remaining.

The rejected matches from the pair process 540 may be output into an agglomerative clustering process 542. The agglomerative clustering algorithm may be applied to the set of items using the embeddings of the items (e.g., the query embedding(s) in the vector space). Accordingly, each of the items may correspond to a single cluster. Iteratively, each of the clusters may be merged with the closest clusters until a stopping criterion is met. For example, the process 500 includes iteratively merging the two clusters that minimize a given linkage criterion (e.g. Ward, average, complete, single) until a single cluster is achieved. The process 500 may include that for all possible clusters, potential match clusters on which the constraint functions are valid may be selected. Match proposals are subsequently ranked based on a weighted harmonic mean of the average similarity of the embeddings in the match proposal and the likelihood of the match based on historical data. From the ranked list, the top matches may be iteratively selected and moved (e.g., to the matched groups) from the set of items until no potential matches are left.

The rejected matches from the agglomerative clustering process 542 may be output into a graph connectivity process 544. The process 500 may include identifying a similarity matrix between all elements of the embedded query (e.g. cosine similarity, inner product, trained function, distance, and the like. A graph may be built and based on the similarity matrix, where each element of the query embedding is a node and two nodes are connected by an edge if the respective similarities is greater than a threshold similarity. The connected components of the graph may be identified and if the constraint functions are valid for a given connected component, a match is identified. Ranking the matches may not occur in the graph connectivity process 544 since there is no overlapping matches in the graph connectivity process 544.

The rejected matches from graph connectivity process 544 may be output into a random walk process 546. The process 500 may include computing a similarity matrix between all elements of the embeddings (e.g., the query embedding(s) and the embeddings), such as by cosine similarity, inner product, learned function, distance between the embeddings, and so forth. The process 500 may include building a graph based on the similarity matrix, where each element of the query embedding is a node and two nodes are connected by an edge if the respective similarities is greater than a threshold similarity and the edge weight is a function of the similarity.

For each node, a quantity of random walks starting from a first node are performed on the graph, where the probability of moving to a neighboring node (e.g., neighbors from the latest visited node or neighbors from all visited nodes) is proportional to the edge weight. A random walk may be performed until a given quantity of steps or until a stopping criteria is met. Nodes may be added to the candidate match in sequence. From the quantity of node sequences arising from the random walk, instances where the constraint functions are valid may be selected as candidate matches. Match proposals may be ranked based on a weighted harmonic mean of the average similarity of the embeddings in the match proposal and the likelihood of the match based on historical data. From the ranked list of match pair proposals, the top match pairs may be moved to the matched groups 530 the until no potential matches are left.

The rejected matches from the random walk process 546 may be output into a density-based clustering process 548.

The process 500 may include a density-based clustering process 548 (e.g. Density-Based Spatial Clustering of Applications with Noise (DBSCAN), Ordering Points to Identify the Clustering Structure (OPTICS), etc.) or other unsupervised clustering algorithms (e.g. K-Means where the dataset is partitioned into k groups or clusters) is applied to the set of items using the embeddings of the items in the vector space. For all possible clusters, potential matching clusters in which the constraint functions are valid, may be selected. For each cluster where the constraint functions are valid, items that are not in the cluster but have a high similarity (inner product, cosine similarity, etc.) may be identified. For each of the candidate items, the constraint functions may be evaluated based on the union of the cluster and candidate item. Potential matches may be selected where constraint functions are valid for the union. The match proposals may be ranked based on a weighted harmonic mean of the average similarity of the embeddings in the match proposal and the likelihood of the match based on historical data. From the ranked list of match pair proposals, the top match pairs may be moved to the matched groups 530 the until no potential matches are left.

In some examples, the order of the matching steps may be defined based on the expected complexity of the matches and the expected quantity of matches. The order of the matching steps may be based on the use-case and on the performance achieved based on historical data. Performance may be measured in terms of precision (e.g., quantity of proposed matches or items in proposed matches that are valid) and recall (e.g., quantity of valid matches or items in matches that are found), a weighted mixture of these measures (e.g. F1 score), a per-match type computation of precision, a recall, an F1 score, or other performance metrics. A balance between computational complexity of each step and associated with a set of available items to match and achieved performance may provide guidance to define the order of matching steps.

In some examples, a filtering process may be applied to a set of matches to reject matches that are likely to be invalid. The filtering process may be based on a set of rules based on indicators extracted from the matches, or from a trained neural network that predicts the likelihood of a match being valid based on the embeddings 506 of the items in the match. The filtering process may be applied and the matches that are likely to be invalid may be removed from the set of matches. Removing the invalid matches may provide a variable final set of matches based on precision and recall requirements associated with the process 500. In some examples, the learning process may be updated via feedback from an operator.

Figure 6:
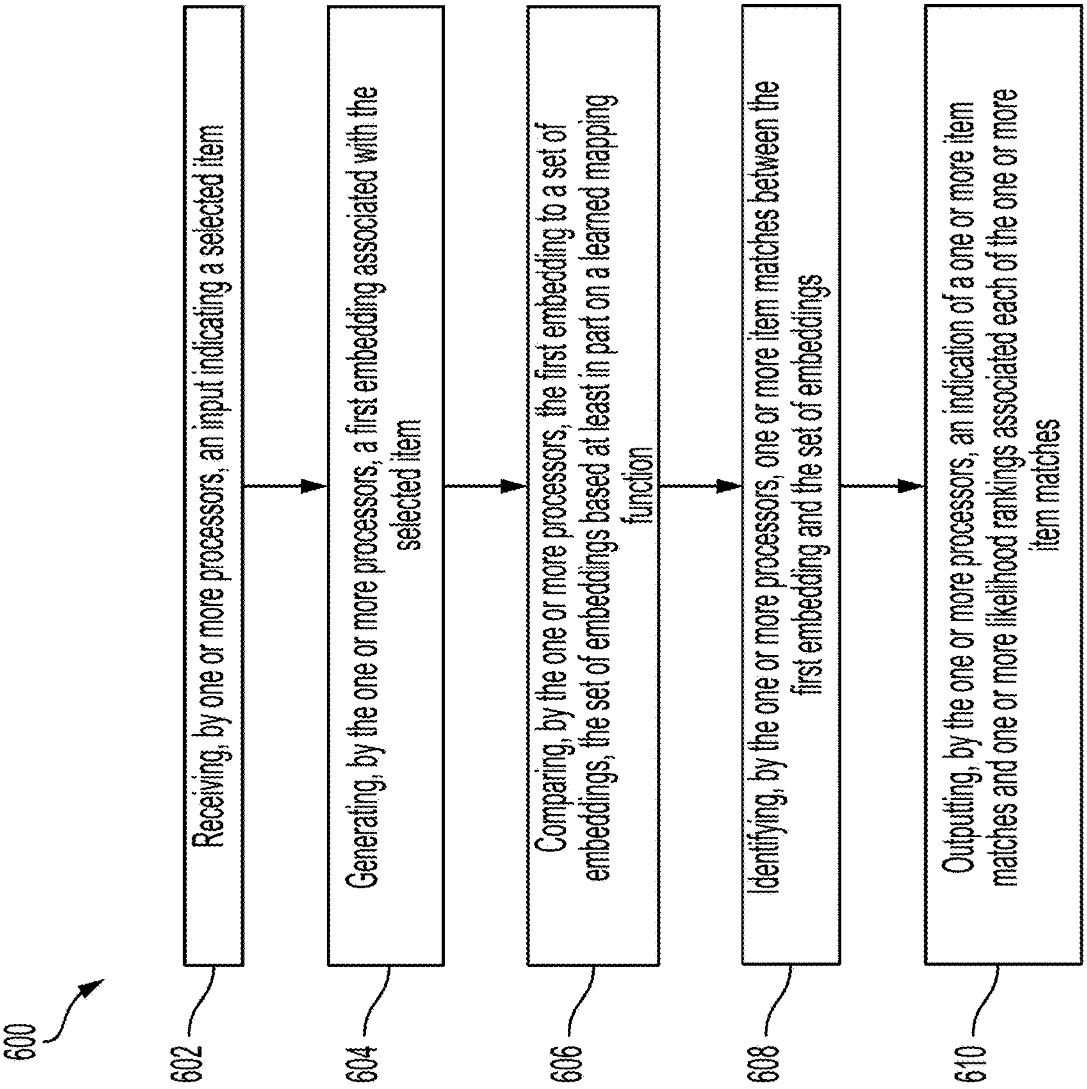
FIG. 6 shows a flow diagram of an example method for item matching in accordance with aspects of the present disclosure.

Referring to FIG. 6, a flow diagram for an example method for monitoring a network resource in accordance with aspects of the present disclosure is shown as a method 600. It is noted that the steps or operations described with reference to FIG. 6 are meant to further illustrate aspects of the functionality provided by the one or more modeling engines 120 (e.g., the modeling engine 120 of FIG. 1). Thus, it is to be understood that the functionality described below with reference to the method 600 may be provided by the computing device 110, networks 150, or other types of devices configured to perform the steps of the method 600. The steps or operations of the method 600 may be stored as instructions (e.g., the instructions 116 and/or one or more modeling engines 120) that, when executed by one or more processors (e.g., the one or more processors 112 and/or the one or more modeling engines 120 of FIG. 1), cause the one or more processors to perform the steps of the method 600. It should be understood that the method 600 may be configured to perform various ones of the operations described above with reference to FIGS. 1-6. In the following description of the method 600, the operations performed may be performed in different orders or at different times than the exemplary order shown. Some operations may also be omitted from the method 600, or other operations may be added to the method 600.

At step 602, the method 600 may include receiving, by one or more processors, an input indicating a selected item. The selected item, the set of input data, or both, may include text data, tabular data, or both. At step 604, the method 600 may include generating, by the one or more processors, a first embedding associated with the selected item.

At step 606, the method 600 may include comparing, by the one or more processors, the first embedding to a set of embeddings, the set of embeddings based on a learned mapping function. The set of embeddings may be based on previously identified item matches and an embedding function.

To generate the learned mapping function, the method 600 may include applying, by the one or more processors, an embedding function to a set of input data to generate the set of embeddings, wherein the set of input data comprises previously identified item matches. The method 600 may include generating, by the one or more processors, a vector space representation of the set of embeddings. The method 600 may include applying, by the one or more processors, a loss function to the vector space representation of the set of embeddings. The method 600 may include generating, by the one or more processors, the learned mapping function based on applying the loss function to the vector space representation of the set of embeddings.

At 608, the process 600 may include identifying, by the one or more processors, one or more item matches between the first embedding and the set of embeddings. In some examples, the identifying the one or more matches may be based on a distance between each of the set of embeddings in the vector space.

In some examples, identifying the one or more item matches may be based on a multi-stage process comprising a plurality of algorithms, the multi-stage process organized in a cascade structure. The output of a first stage of the multi-stage process may include moving the item matches to a matched group while inputting unmatched items into a second stage of the multi-stage process. Moving the item matches to the matched group may be based on a similarity value threshold.

At 610, the method 600 may include outputting, by the one or more processors, an indication of a one or more item matches and one or more likelihood rankings associated with each of the one or more item matches. In some examples, the method 600 may include receiving, by the one or more processors, input indicating selection of a portion of item matches from the one or more item matches. The method 600 may include generating, by the one or more processors, a reranking of the one or more likelihood rankings based on the selection of the portion of item matches.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method, comprising:

receiving, by one or more processors, an input indicating a selected item;

generating, by the one or more processors, a first embedding associated with the selected item;

comparing, by the one or more processors, the first embedding to a set of embeddings, the set of embeddings based at least in part on a learned mapping function;

identifying, by the one or more processors, one or more item matches between the first embedding and the set of embeddings, wherein identifying comprises using a transformer-based model that is tuned using contrastive loss to minimize or maximize a distance between pairs of items represented by embeddings in a vector space, wherein identifying the one or more item matches is based at least in part on a multi-stage process comprising a plurality of distinct matching algorithms organized in a cascade structure, and wherein an output of a first stage of the multi-stage process comprises moving the item matches to a matched group while inputting unmatched items into a second stage of the multi-stage process, and wherein the second stage employs a different matching algorithm than the first stage; and outputting, by the one or more processors, an indication of the one or more item matches and one or more likelihood rankings associated each of the one or more item matches.

2. The method of claim 1, wherein the set of embeddings is based at least in part on previously identified item matches and an embedding function.

3. The method of claim 1, further comprising:

applying, by the one or more processors, an embedding function to a set of input data to generate the set of embeddings, wherein the set of input data comprises previously identified item matches;

generating, by the one or more processors, the vector space representation of the set of embeddings;

applying, by the one or more processors, a loss function to the vector space representation of the set of embeddings; and generating, by the one or more processors, the learned mapping function based at least in part on applying the loss function to the vector space representation of the set of embeddings.

4. The method of claim 1, wherein the identifying the one or more matches is based at least in part on a distance between each of the set of embeddings in the vector space.

5. The method of claim 1, further comprising:

receiving, by the one or more processors, input indicating selection of a portion of item matches from the one or more item matches; and generating, by the one or more processors, a reranking of the one or more likelihood rankings based at least in part on the selection of the portion of item matches.

6. The method of claim 1, wherein the selected item, a set of input data, or both, comprise text data, tabular data, or both.

7. The method of claim 1, wherein moving the item matches to the matched group is based at least in part on a similarity value threshold.

8. An apparatus, comprising:

one or more memories storing processor-executable code; and one or more processors coupled with the one or more memories and individually or collectively operable to execute the code to cause the apparatus to:

receive an input indicating a selected item;

generate, a first embedding associated with the selected item;

compare the first embedding to a set of embeddings, the set of embeddings based at least in part on a learned mapping function;

identify one or more item matches between the first embedding and the set of embeddings, wherein to identify comprises using a transformer-based model that is tuned using contrastive loss to minimize or maximize a distance between pairs of items represented by embeddings in a vector space, wherein to identify the one or more item matches is based at least in part on a multi-stage process comprising a plurality of distinct matching algorithms organized in a cascade structure, and wherein an output of a first stage of the multi-stage process comprises moving the item matches to a matched group while inputting unmatched items into a second stage of the multi-stage process, and wherein the second stage employs a different matching algorithm than the first stage; and output an indication of the one or more item matches and one or more likelihood rankings associated each of the one or more item matches.

9. The apparatus of claim 8, wherein the set of embeddings is based at least in part on previously identified item matches and an embedding function.

10. The apparatus of claim 8, wherein the one or more processors are individually or collectively further operable to execute the code to cause the apparatus to:

apply an embedding function to a set of input data to generate the set of embeddings, wherein the set of input data comprises previously identified item matches;

generate the vector space representation of the set of embeddings;

apply a loss function to the vector space representation of the set of embeddings; and generate the learned mapping function based at least in part on applying the loss function to the vector space representation of the set of embeddings.

11. The apparatus of claim 8, wherein the identifying the one or more matches is based at least in part on the distance between each of the set of embeddings in a vector space.

12. The apparatus of claim 8, wherein the one or more processors are individually or collectively further operable to execute the code to cause the apparatus to:

receive input indicating selection of a portion of item matches from the one or more item matches; and generate a reranking of the one or more likelihood rankings based at least in part on the selection of the portion of item matches.

13. The apparatus of claim 8, wherein the selected item, a set of input data, or both, comprise text data, tabular data, or both.

14. The apparatus of claim 8, wherein moving the item matches to the matched group is based at least in part on a similarity value threshold.

15. A non-transitory computer-readable medium storing code for wireless communication, the code comprising instructions executable by one or more processors to:

receive an input indicating a selected item;

generate, a first embedding associated with the selected item;

compare the first embedding to a set of embeddings, the set of embeddings based at least in part on a learned mapping function and previously identified item matches;

identify one or more item matches between the first embedding and the set of embeddings, wherein to identify comprises using a transformer-based model that is tuned using contrastive loss to minimize or maximize a distance between pairs of items represented by embeddings in a vector space, wherein to identify the one or more item matches is based at least in part on a multi-stage process comprising a plurality of distinct matching algorithms organized in a cascade structure, and wherein an output of a first stage of the multi-stage process comprises moving the item matches to a matched group while inputting unmatched items into a second stage of the multi-stage process, and wherein the second stage employs a different matching algorithm than the first stage; and output an indication of the one or more item matches and one or more likelihood rankings associated each of the one or more item matches.

16. The non-transitory computer-readable medium of claim 15, wherein the set of embeddings is based at least in part on previously identified item matches and an embedding function.

* * * * *